(12) United States Patent
Smith

(10) Patent No.: US 7,512,248 B2
(45) Date of Patent: Mar. 31, 2009

(54) METHOD OF INCORPORATING A SECONDARY IMAGE INTO A PRIMARY IMAGE

(75) Inventor: Ian Rodney Smith, Stockport (GB)

(73) Assignee: Nautilus (GB) Limited, Stockport (GB)

( * ) Notice: Subject to any disclaimer, the term of this patent is extended or adjusted under 35 U.S.C. 154(b) by 463 days.

(21) Appl. No.: 10/503,996

(22) PCT Filed: Feb. 8, 2003

(86) PCT No.: PCT/GB03/00551

§ 371 (c)(1),
(2), (4) Date: Feb. 16, 2005

(87) PCT Pub. No.: WO03/067892

PCT Pub. Date: Aug. 14, 2003

(65) Prior Publication Data

US 2005/0141940 A1    Jun. 30, 2005

(30) Foreign Application Priority Data

Feb. 8, 2002    (GB)    ................. 0202962.7

(51) Int. Cl.
*G06K 9/00*    (2006.01)
*G06K 15/00*    (2006.01)
*H04N 1/40*    (2006.01)
*B42D 15/00*    (2006.01)
*B42D 15/10*    (2006.01)

(52) U.S. Cl. .............. 382/100; 358/1.18; 358/3.28; 283/72

(58) Field of Classification Search .......... 358/1.18, 358/3.28; 283/72–81, 113; 382/100
See application file for complete search history.

(56) References Cited

U.S. PATENT DOCUMENTS

| 5,178,418 | A | * | 1/1993 | Merry et al. ............ 283/73 |
| 5,708,717 | A | | 1/1998 | Alasia |
| 6,171,734 | B1 | | 1/2001 | Warner et al. |
| 6,209,922 | B1 | | 4/2001 | Klein ..................... 283/72 |
| 6,768,558 | B1 | * | 7/2004 | Yamashita et al. ...... 358/1.18 |

FOREIGN PATENT DOCUMENTS

| EP | 0953939 | 11/1999 |
| EP | 1102208 | 5/2001 |
| ES | 2119705 | 10/1998 |
| GB | 2315240 A | 1/1998 |
| WO | WO98/07572 | 2/1998 |
| WO | WO01/87632 | 11/2001 |

* cited by examiner

*Primary Examiner*—Bhavesh M Mehta
*Assistant Examiner*—Nathan Bloom
(74) *Attorney, Agent, or Firm*—Bracewell & Giuliani LLP

(57) ABSTRACT

A method of incorporating a second image into a primary image. A vectorial grid is created that is adapted for mapping on to the primary image. A deformation is applied to the grid using data from the second image. The deformed grid is then mapped onto the primary image to create an output image. The second image is revealable by applying a decoder to the output image.

4 Claims, 6 Drawing Sheets

METHOD OF INCORPORATING A SECONDARY IMAGE INTO A PRIMARY IMAGE

FIELD OF THE INVENTION

The invention relates to a method of incorporating a secondary image into a primary image.

BACKGROUND OF THE INVENTION

It has long been known to print documents, to protect them from forgery, using fine patterns constituting a background for a main image. The more complex the fine pattern, the more difficult it is to reproduce.

The developments of xerography, laser printing and scanning have created new problems for the printer. Special measures have been devised to make security documents uncopiable by standard or even advanced state of the art copiers and scanners, EP 0920383 being an example of such in which an "object" is worked into a background pattern by linear components of the background being "hollowed" i.e. thick lines becoming slightly spaced thin lines. Such hollowed regions are not readily visible to the naked eye, so they do not mar the appearance of the major image, but they "fool" a photocopier, and are visible in a photocopy. The object" in question can be a word, such for example, as "FORGERY".

This is fine for demoralising the would-be forger who is sophisticated enough only to rely on a photocopier. The first copy taken on the machine appears with the word "FORGERY" in it, and the would-be forger is supposed to abandon the attempt.

The determined forger, however, will realise that he is simply using the wrong copying technique, and switch to something more appropriate.

Essentially, the truth of the mailer is that anything that can be made can be copied, if enough resource is put into the attempt. It is, clearly, only necessary to replicate the production process for the original, and the copy will be perfect. Where there is sufficient incentive, the cost of replicating the production process will be willingly borne by the forger.

There are documents, however, that, while needing to be secure, do not merit undue cost in their creation.

SUMMARY OF THE INVENTION

In accordance with a first aspect of the present invention, there is provided a method of incorporating a second image into a primary image, the method comprising:
 (a) creating a vectorial grid adapted for mapping on to the primary image;
 (b) applying a deformation to the grid using data from the second image;
 (c) mapping the deformed grid onto the primary image to create an output image; and
wherein the second image is revealable by applying a decoder to the output image.

Preferably, the output image is adapted to be printed onto a printing image area.

Typically, the method is used for security printing.

In accordance with a second aspect of the present invention, there is provided a method for security printing comprising incorporating a secondary, hidden, image in a primary image, comprising the steps of:
 creating a vectorial grid adapted for mapping on to the primary image area;
 applying a deformation to the vectorial grid using data from the secondary image;
 mapping the primary image on to the deformed vectorial grid to create a primary image containing hidden information from the secondary image;
 such hidden information being revealable by means of a decoder screen which discloses the vectorial grid formation.

The term "vectorial grid" as used herein covers a two dimensional array of straight parallel lines or curved parallel lines, or a two dimensional array of dots where the dots define an array of substantially parallel lines.

Preferably, the decoder is an optical decoder. Typically, the second image is revealable by viewing the output image through the optical decoder.

In one example of the invention, the grid comprises an array of curved lines. In another example of the invention, the grid comprises an array of straight lines. The lines maybe inclined to the top/bottom axis of the grid.

In a further example of the invention, the grid comprises an array of dots.

Typically, the optical decoder comprises a lenticular screen or grating with the like spacing to the vectorial grid.

However, the vectorial grid could be comprised of wavy lines or a wavy array of dots. Typically, the optical decoder has similar characteristics.

A method for security printing involving off-set dots in a security area is described in WO01/87632. Here, the printing screen is modified, and a special decoding screen used to detect a hidden image in the modified area. However, the modification is not, even though only slight, per se undetectable by the naked eye, and has to be disguised through the use of peripheral dots "tapering off" the dot displacement with respect to background dots.

Security printing produced by the method does not necessarily show up on photocopying, so it may be arranged that photocopies may be made without the copier realising there is a hidden image, but that they would be detectable by the appropriate decoder screen.

BRIEF DESCRIPTION OF THE DRAWINGS

Methods of security printing according to the invention will now be described with reference to the accompanying drawings, in which.

DETAILED DESCRIPTION OF THE INVENTION

Figure 2:
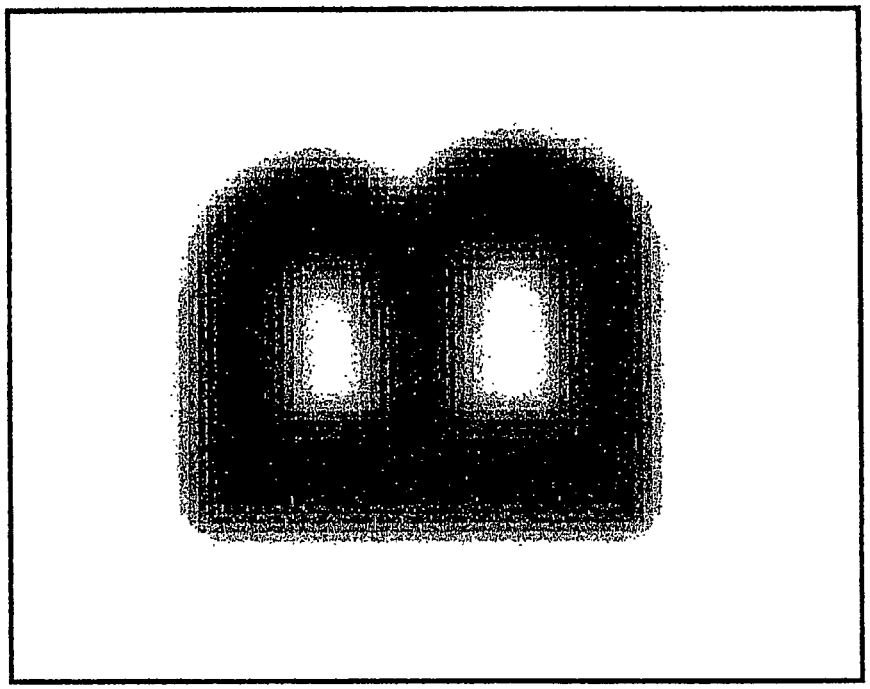
FIG. 2 is a secondary image.
Figure 1:
FIG. 1 is a primary image.
Figure 4:
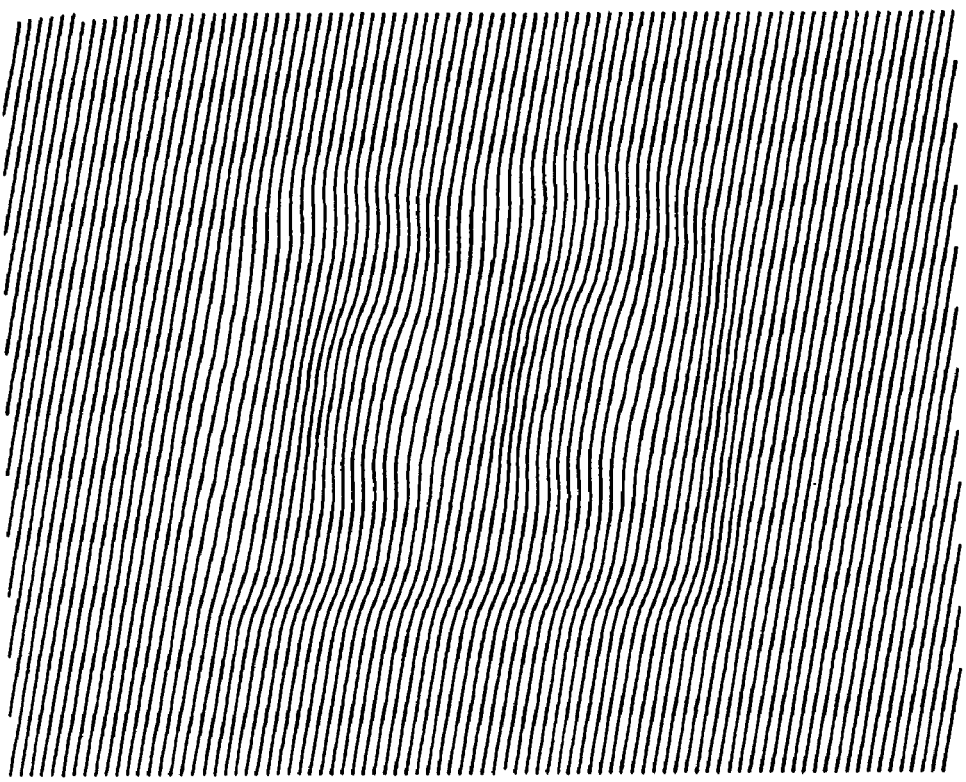
FIG. 4 is the grid of FIG. 3 deformed using data from the secondary image.
Figure 8:
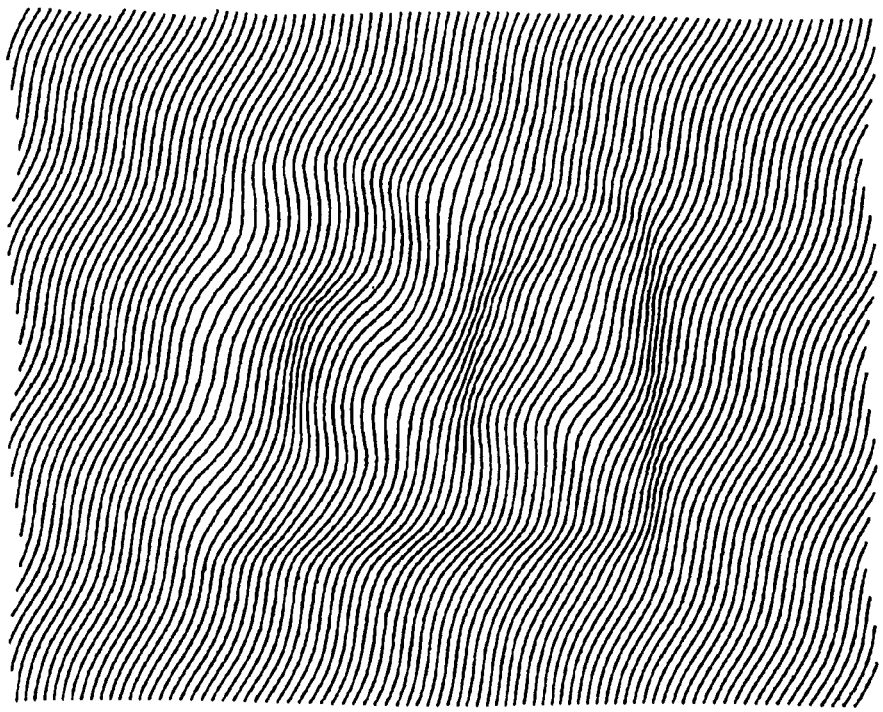
FIG. 8 is the grid of FIG. 7 deformed using data from the secondary image.

The drawings illustrate the methods for security printing comprising incorporating a secondary, hidden image (FIG. 2) in a primary image (FIG. 1), comprising the steps of:
creating a vectorial grid (FIGS. 3 and 7) adapted for mapping on to the printing image area;
applying a deformation to the vectorial grid (FIGS. 3 and 7) using data from the secondary image (FIG. 2) resulting in a deformed grid (FIGS. 4 and 8);
mapping the primary image (FIG. 1) on to the deformed vectorial grid (FIGS. 4 and 8) to create a primary image containing hidden information from the secondary image;

such hidden information being revealable by means of a decoder screen which discloses the vectorial grid information.

Figure 3:
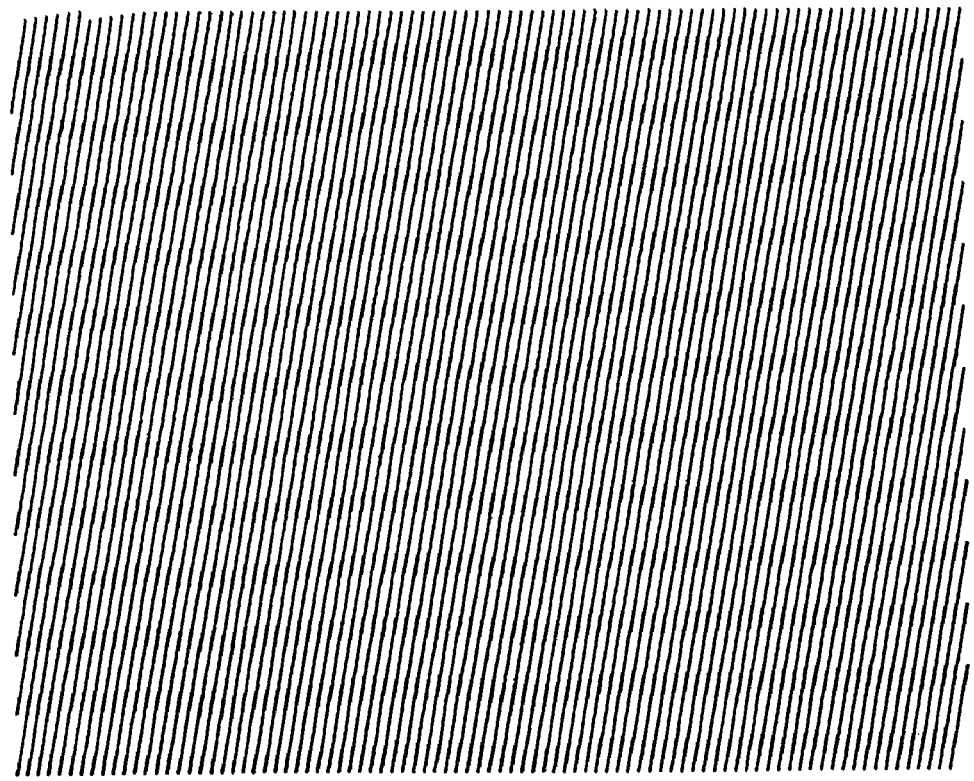
FIG. 3 is a first vectorial grid.
Figure 6:
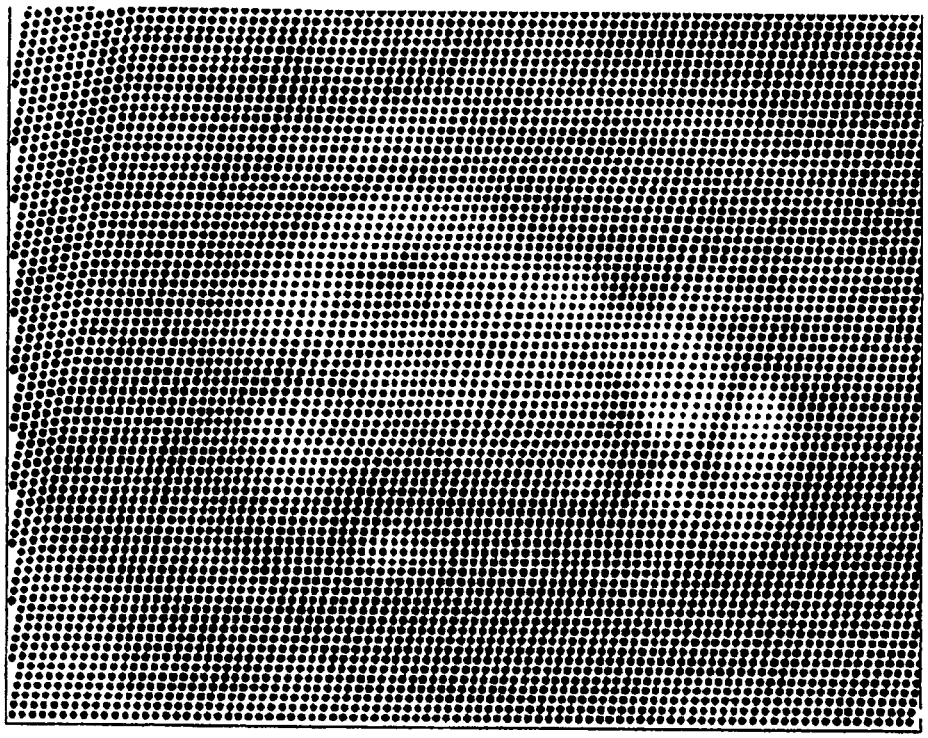
FIG. 6 is an encoded bit map image made by applying the deformed grid of FIG. 4 to the primary image.
Figure 5:
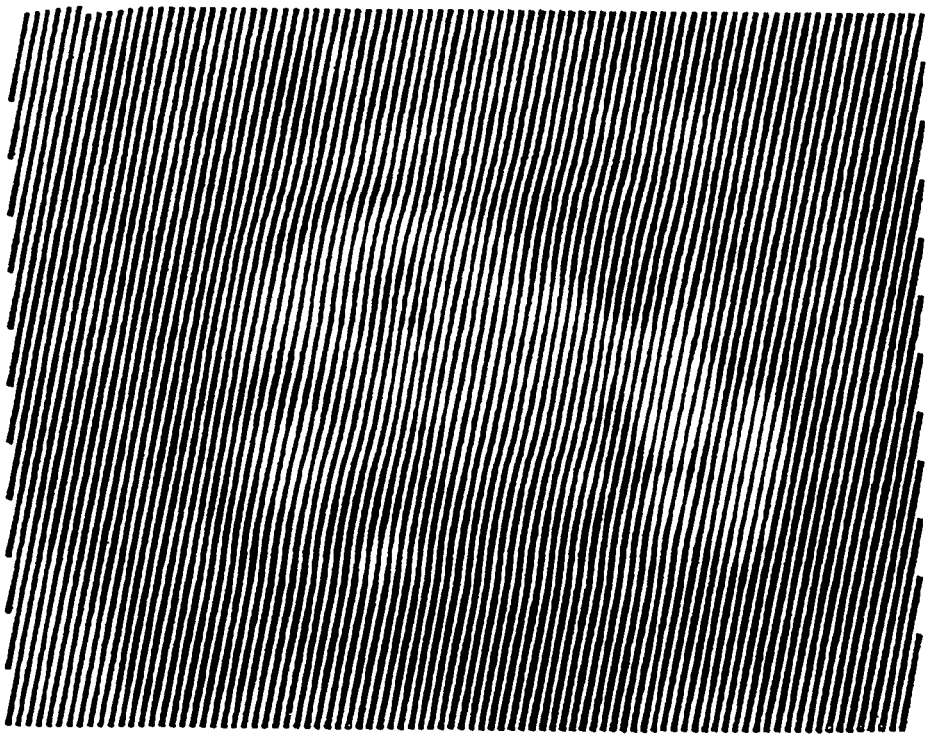
FIG. 5 is an encoded vector image being the primary image mapped on to the deformed vectorial grid of FIG. 4.
Figure 7:
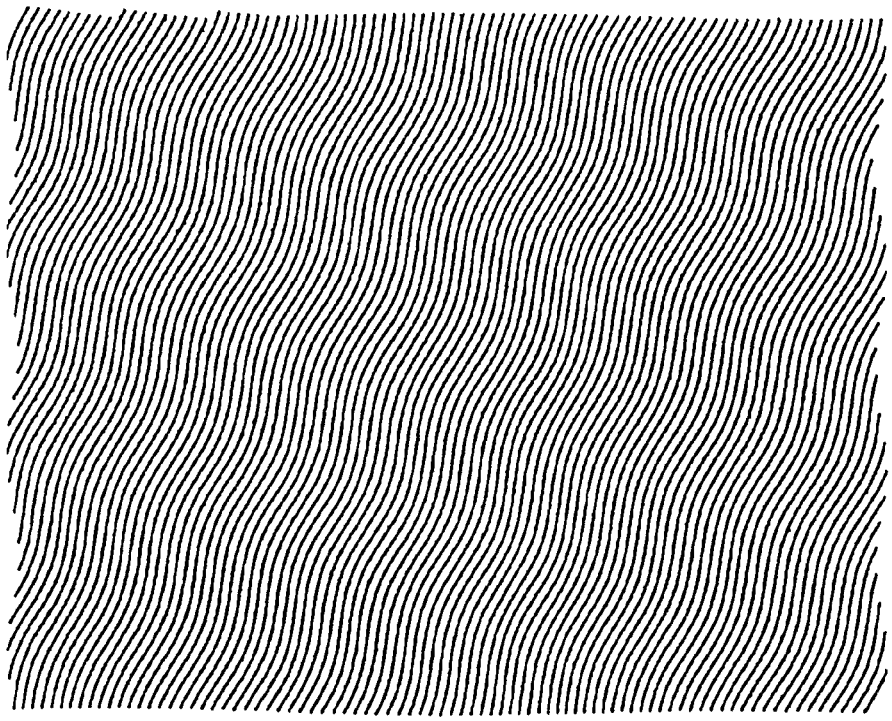
FIG. 7 is a second vectorial grid.
Figure 10:
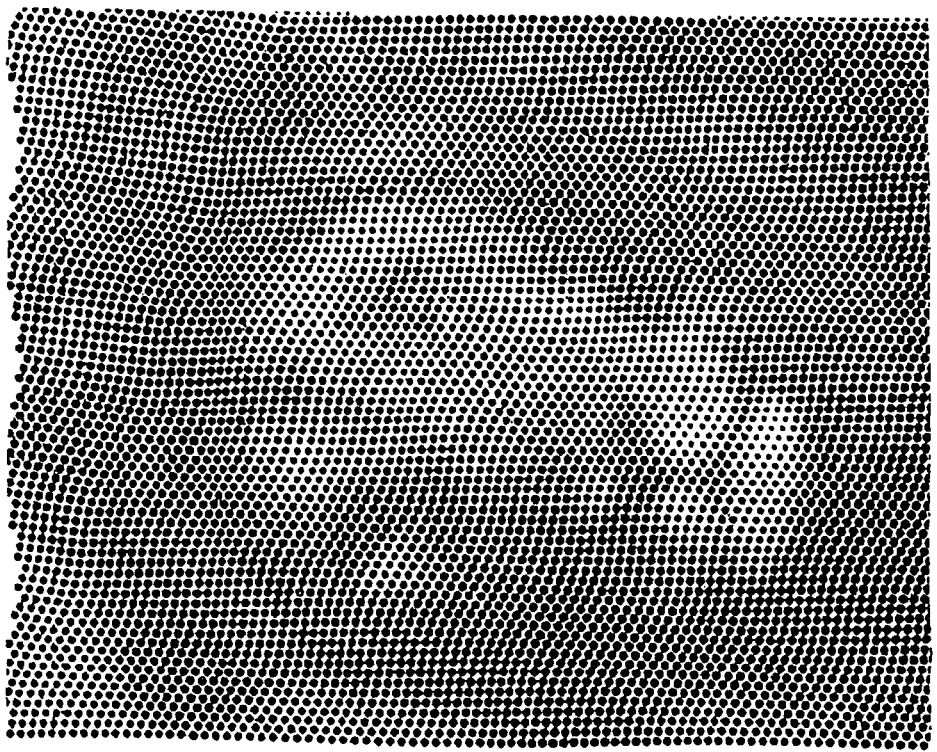
FIG. 10 is an encoded bit map image obtained by applying the deformed grid of FIG. 8 to the primary image.
Figure 9:
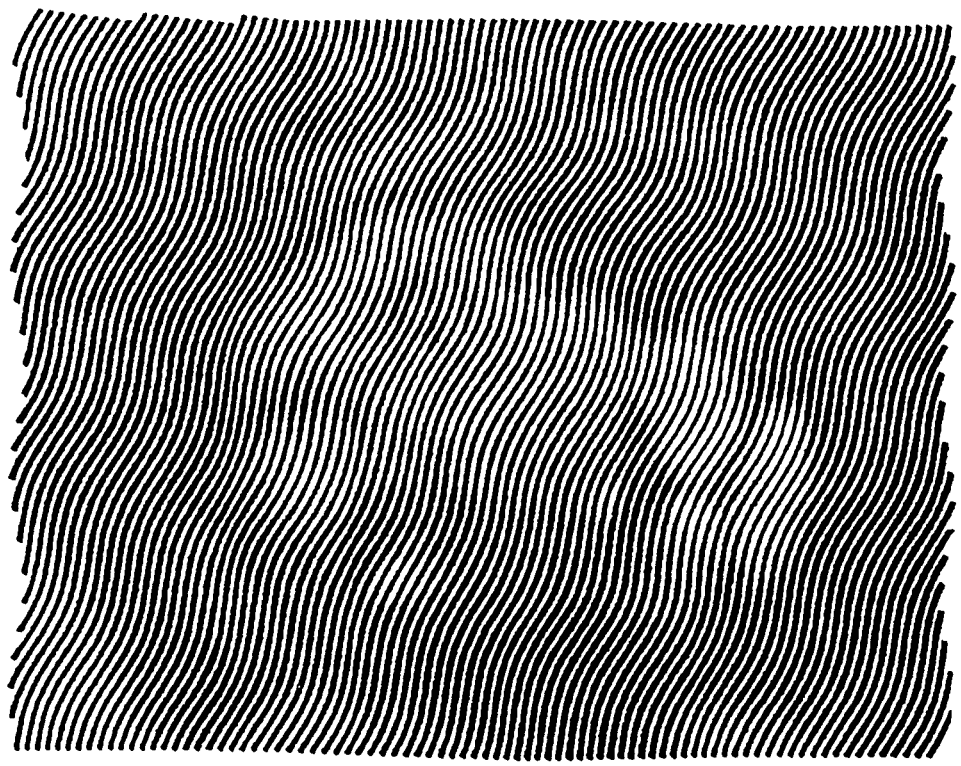
FIG. 9 is an encoded vector image obtained by applying the deformed grid of FIG. 8 to the primary image.

FIG. 3 shows a vectorial grid of straight lines, while FIG. 7 shows a vectorial grid of wavy lines, in each case inclined to the top/bottom axis A-A of the image space. The lines could, in each case, be replaced by corresponding arrays of dots.

The final images, FIGS. 5, 6, 9 and 10 contain no information visible to the naked eye that they are other than they appear. They can even be arranged to be photocopiable without any hidden image showing up in the copy, although, of course, it can readily be arranged, by an convenient prior art techniques, that they are also not photocopiable.

Figure 11:
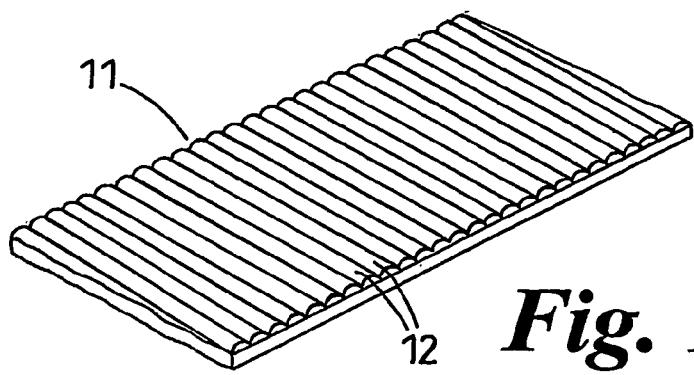
FIG. 11 shows a first decoding screen.

FIG. 11 shows a first decoding screen 11 suitable for use with images generated using the vectorial grid of FIG. 3. It comprises a transparent decoding lens, which can be moulded in clear plastic, with cylindrical lenticules 12 aligned and spaced exactly as the vectorial grid lines by FIG. 3.

A decoding screen suitable for images generated using the grid of FIG. 7 would be similar, but with the lenticules 12 made wavy, corresponding to the waves of the FIG. 7 grid.

Figure 12:
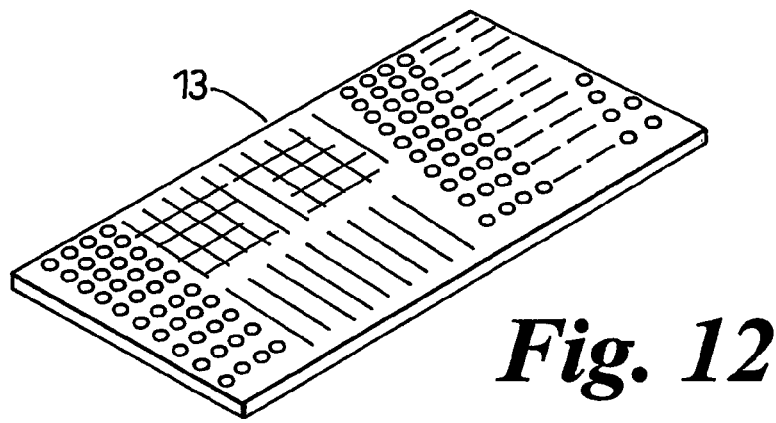
FIG. 12 shows a secondary decoding screen.

FIG. 12 illustrates a decoding screen 13 suitable for use with a vectorial grid comprising an array of dots rather than a grid of lines. Instead of the cylindrical lenticules of FIG. 11, it has spherical lenticules correspondingly arrayed to the dots of the vectorial grid.

Figure 13:
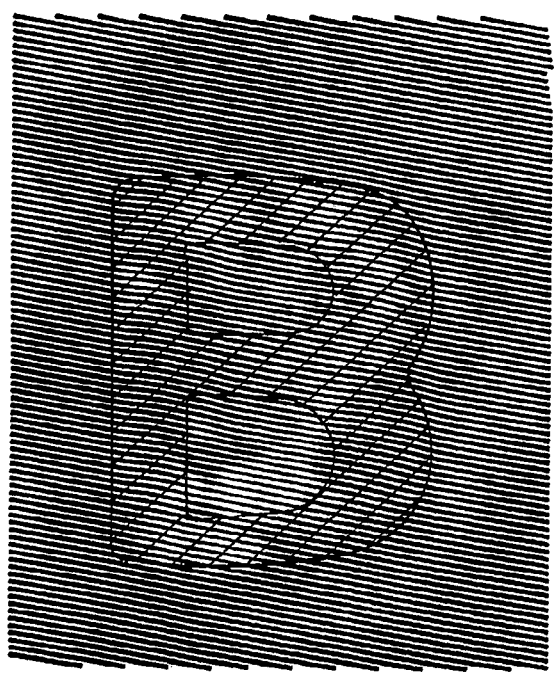
FIG. 13 shows the effect of using an appropriate decoding screen on an encoded image.

FIG. 13 shows how the hidden secondary image is revealed when overlain with a decoding screen.

The method is suitable for both monochrome and colour images, and can be used equally well on still images and on movie frames, when the secondary image can itself be a movie image.

In colour printing, multiple secondary images can be hidden within different separations of a colour output of type CYMK (cyan, yellow, magenta, black), RGB (red, green, blue), or multiple spot colours. The different hidden images can be revealed individually by different colour filter decoding screens.

In an image of a person, personal data can be included as the secondary image. The final image may be a low-resolution raster image, and may be in colour.

The primary image may be a flat tint and the greyscale density from the secondary image used to encode it—the result looks like a flat tint. The hidden data in the final picture is revealed by a decoder screen which can comprise a lenticular screen or a grating, which may be of straight or wavy lines, or an array (straight or wavy) of dots.

Multiple secondary images can be used in this way for different colours, as before, to make a CYMK, RGB or multiple spot colour image.

A "still" movie can be made by incorporating within a primary image date from a plurality of time-linked secondary images. As the decoder screen is turned through different angles, the secondary images are revealed in sequence. Whilst this can, of course, be used in a security printing context, it can also be of more general appeal, in children's publications, greetings cards and point-of-sale promotions, for example.

As an additional security measure, the primary image may comprise an almost flat tint filled with microtext. The secondary image can be of line work or a grey scale image, and distorts the primary image by shifting letters or letter sequences in the microtext relative to others. The decoder reveals the hidden image. Microtext will usually defeat photocopying because the photocopier does not have the resolving power to reproduce microtext.

In addition, the frequency of the lines or dots may vary across the grid. For example, if the grid comprises lines, the spacing of two adjacent lines in the grid may be different from the spacing between another two adjacent lines in the grid.

The method can be configured in printer-driving software.

The invention claimed is:

1. A method of incorporating a second image into a primary image the method comprising:
utilizing a processor to perform the steps of:
(a) creating a curved or wavy vectorial grid adapted for mapping on to the primary image:
(b) applying a deforming to the grid using data from the second image; and
(c) mapping the deformed grid onto the primary image to create an output image;
wherein the second image is revealable by applying a decoder to the output image;
wherein the vectorial grid comprises a two-dimensional array of curved or wavy lines; and
wherein the decoder is an optical decoder which is a lenticular screen or grating with a like spacing to the vectorial grid, whereby the second image is revealed by viewing the output image through the optical decoder.

2. A method according to claim 1 wherein the output image is adapted to be printed onto a printed image area.

3. A method according to claim 1 wherein the frequency of the line varies across the vectorial grid, whereby the spacing of two adjacent lines in the grid is different from the spacing between another two adjacent lines in the grid.

4. A method according to claim 1 wherein the optical decoder is a transparent decoding lens with cylindrical lenticules aligned and spaced as for a vectorial grid.

* * * * *